United States Patent [19]
Mead

[11] 4,296,999
[45] Oct. 27, 1981

[54] OPTICAL FIBRE CONNECTORS

[75] Inventor: John F. Mead, Princes Risborough, England

[73] Assignee: Plessey Handel und Investments AG, Zug, Switzerland

[21] Appl. No.: 87,529

[22] Filed: Oct. 23, 1979

[51] Int. Cl.³ .............................................. G02B 7/26
[52] U.S. Cl. ............................. 350/96.21; 350/96.18
[58] Field of Search ............... 350/96.18, 96.20, 96.21, 350/96.22

[56] References Cited

U.S. PATENT DOCUMENTS

| | | | |
|---|---|---|---|
| 4,050,783 | 9/1977 | Tardy | 350/96.21 |
| 4,090,778 | 5/1978 | Phillips et al. | 350/96.20 |
| 4,190,316 | 2/1980 | Malsby et al. | 350/96.18 |
| 4,198,122 | 4/1980 | Prunier et al. | 350/96.21 |
| 4,215,913 | 8/1980 | Turley et al. | 350/96.21 |

*Primary Examiner*—John D. Lee
*Attorney, Agent, or Firm*—Fleit & Jacobson

[57] ABSTRACT

Connection between optical fibres must be very precise to avoid light loss across the connection and it is an object of this invention to provide a connector which can be used to connect fibres accurately, in poor lighting conditions and in the minimum of time.

This is achieved by providing a connector consisting of two identical couplers each having a probe over which is slidably mounted a probe-gripping collet. The two couplers are aligned with the probes of the couplers aligned and abutting, and one of the collets of one of the couplers is moved along to span the abuttment between the two probes, thus holding the probes in precise alignment.

12 Claims, 21 Drawing Figures

OPTICAL FIBRE CONNECTORS

The present invention relates to Optical Connectors and more particularly to demountable hermaphrodite connectors in which a coupling of a connector can function both as a male or female.

The advantage of the hermaphrodite connector is that in situations where connections between optical fibres are required to be changed rapidly and for example under poor light conditions, it is simpler to employ hermaphrodite coupling parts as opposed to male and female parts which require matching before connections can be made.

Optical connectors must be capable of maintaining a high degree of precision alignment at the interface of the joint and therefore for repeatability of this precision the connector is required to be mechanically robust.

The object of the present invention therefore is to provide an optical connector consisting of couplers which can be joined together to optically connect together two optical fibres rapidly and precisely.

According to the present invention an optical connector comprises two substantially identical coupling means adapted to be joined together to optically connect two optical fibres, each coupling means comprising a probe adapted to be secured to the end of an optical fibre and elongate probe gripping means axially slidably mounted on the probe, the arrangement being such that when the two coupling means are aligned with their respective probes in abutting axial alignment, one of the probe gripping means of one of the coupling means can be moved axially to span the abuttment between the two probes thereby holding the two probes in axial alignment.

The optical connector is preferably suitable for connecting optical fibres with or without intermediate lenses.

Each part of the connector may include a sliding collet connecting device as described in our copending application No. 40159/76 corresponding to U.S. application Ser. No. 837,286, now abandoned in favor of continuation application Ser. No. 053,796, now abandoned in favor of continuation application Ser. No. 186,242.

The two coupling means of the connector may be held together by a bayonet gate retaining device and the probes within each coupling means may be spring urged towards each other. Each coupling means is preferably designed to allow a degree of end float at the connection of the optical fibres, thus preventing side forces on the connector from affecting alignment of the fibres which would impair the accuracy of the connection.

Embodiments of the present invention will now be described by way of example with reference to the accompanying drawings in which.

Figure 1A:
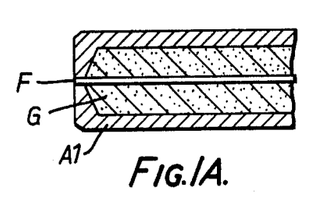
FIGS. 1A, 1B show a first type of optical fibre probe for use in the connector.
Figure 1B:
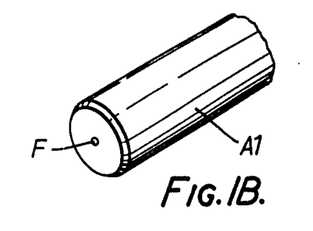
Figures 2A, 2B, 2C, 2D, 2E:
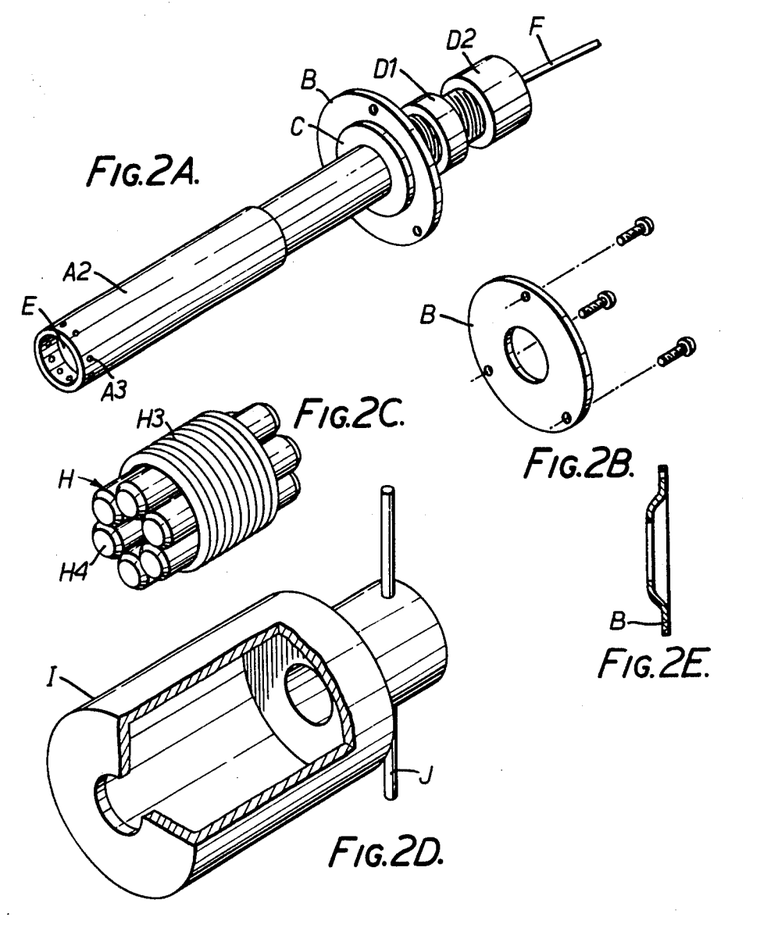
FIG. 2A shows a second type of probe and optical fibre support assembly.
FIG. 2B shows a spring washer/diaphragm assembly for use with the probe of FIG. 1 or FIG. 2A.
FIG. 2C shows a spring collet as described in our co-pending patent application No. 40159/76.
FIG. 2D shows the housing of the collet chuck which forms part of a coupling.
FIG. 2E shows an alternative spring washer/diaphragm assembly to the one shown in FIG. 2B.

Referring now to FIGS. 1A, 1B and 2A of the drawings, there is shown a first probe A1 in FIGS. 1A, 1B and a second probe A2 in FIG. 2A. The first comprises a hollow cylinder A1 which is precision ground on its outside diameter and an optical fibre F is positioned within an accurately positioned hole in the centre of the end of the cylinder and is secured therein by means of an epoxy adhesive G.

The second probe A2 is for mounting an optical fibre with a lens on the end. The arrangement may be seen by reference to FIG. 2A and FIGS. 3A and 3B which show the probe in cross section. A lens E is positioned a short distance inside the cylinder A2 and holes A3 as shown are provided round the cylinder to allow debris to fall out or to be washed out by cleaning fluid or by an air blast.

Each type of probe is provided with a locating flange C and a beryllium copper or stainless metal or plastic flat spring washer B is provided between the flange C and a lock nut D1. The flat spring washer B may alternatively be a dished spring or an annular corrugated section spring as shown in FIG. 2E. The bore of the washer/diaphragm B is larger than the outside diameter of the probe A2 and thus the probe can be orientated within limits while still being located longitudinally by the flange C, the washer/diaphragm B and lock nut D1. The diaphragm B can also allow the probe assembly to move along its axis as it has a dished spring effect when it is constrained by fixing screws on the periphery of the diaphragm (see FIG. 6). A back plate D2 is provided on the end of the probe A2 to support the optical fibre F.

Since the mechanical arrangements for connecting both types of probe A1 and A2 are the same, the description and drawings are now confined to the example using the lens and fibre arrangement.

Referring now to FIGS. 2C and 2D a spring loaded collet H is shown which comprises a number, in this case six, of precision rods H4 held together by a coil spring H3. This arrangement is described in greater detail in our co-pending patent application No. 40159/76. The collet H fits within a housing I and is retained therein. Housing I is provided with driving pins J with which the housing I can be moved forwards and backwards by a sleeve Q (see FIG. 5) which is provided with an annular groove S for the reception of the pins J.

Figure 3A:
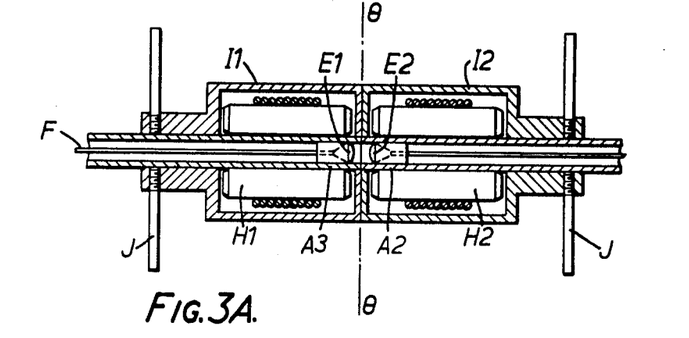
FIG. 3A shows in cross section two optical fibre, collet and housing assemblies of FIGS. 2A, 2C and 2D in a first position.
Figure 3B:
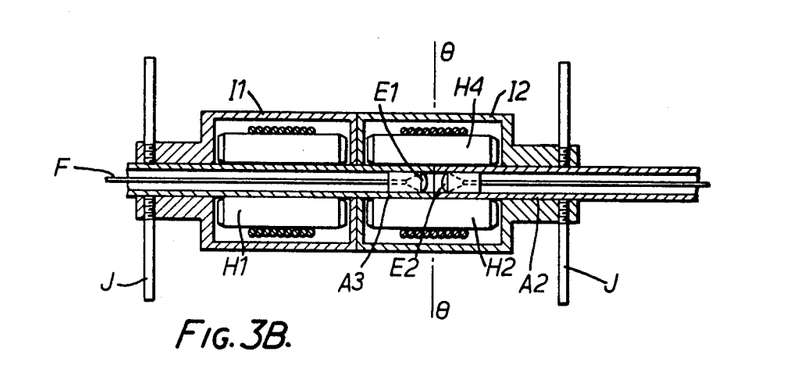
FIG. 3B shows in cross section the two optical fibre, collet and housing assemblies of FIGS. 2A, 2C and 2D in a second position.

Referring now to FIG. 3, there is shown two housing and collet assemblies I1, H1, and I2, H2 opposed to one another. If the right hand assembly I2, H2 is pushed towards the left hand side while retaining probes A2, A3 stationary then as shown in FIG. 3B, the collet rods will eventually span the joint line $\theta$—$\theta$ and will grip and hold both probes and thus force them into alignment with each other at approximately the mid position along the length of collet H2. The left hand collet system H1 will at the same time become redundant as it is pushed away to the left hand side.

Figure 4:
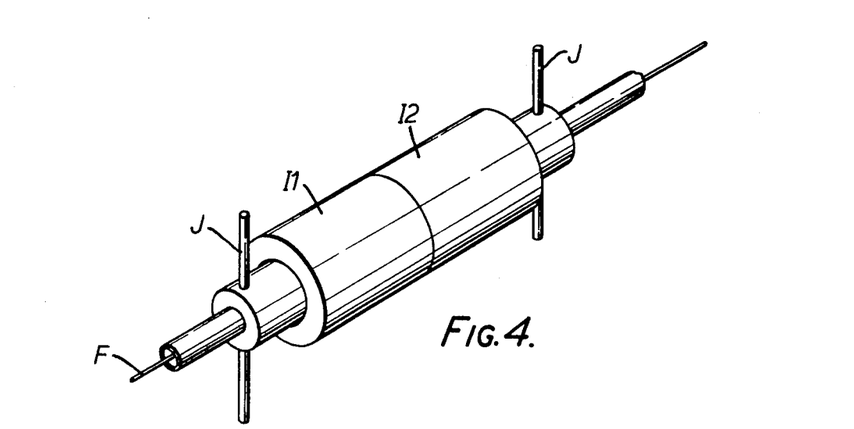
FIG. 4 shows an external perspective view of two collet housings in the position shown in FIGS. 3A or 3B.

The external appearance of the two housing assemblies I1, I2 is shown in FIG. 4 which illustrates that the housings fit reasonably tightly together thus forming a partial seal against dirt, moisture etc.

FIGS. 3A, 3B illustrate the sliding principle of operation of the connector and it is necessary to provide a connector which can produce this sliding action. Such a connector can be seen in FIGS. 5 and 6 to which reference is now made.

Figure 5:
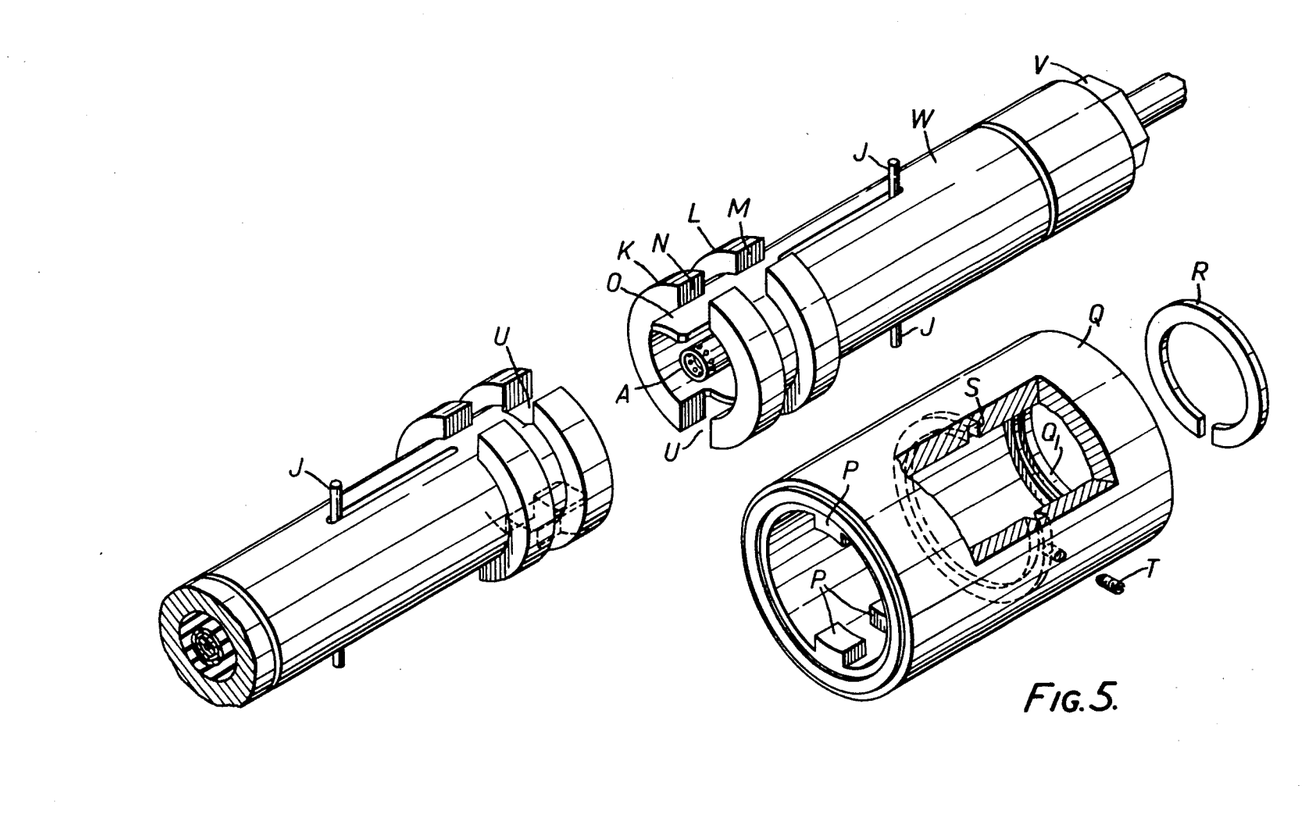
FIG. 5 shows an exploded view of the connector assembly showing two coupling members each including a housing assembly as shown in FIGS. 3A, 3B and 4.
Figure 6:
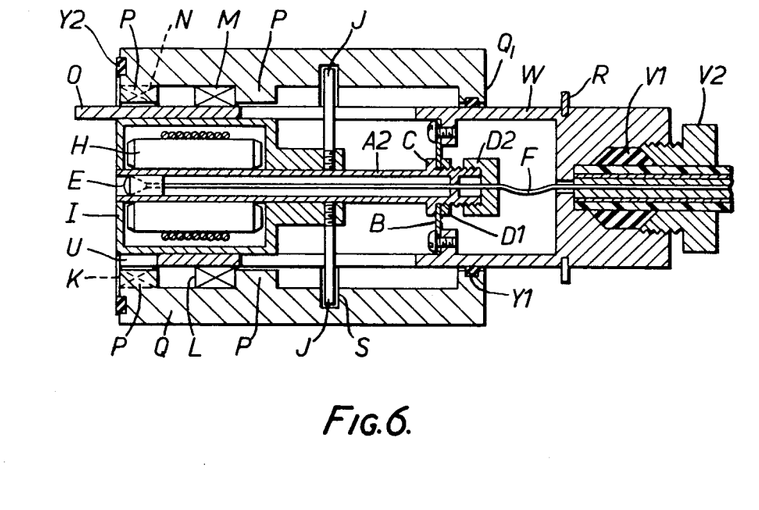
FIG. 6 shows a coupling member in cross section.

The sliding collet H and the housing assembly I is fitted within a main body W which has two machined flange rings K and L as shown.

A sleeve Q is fitted over the main body W and the drive pins J are fitted into the housing I through a hole in the sleeve Q which is subsequently filled by a screw T. The pins J co-operate with the groove S formed in the sleeve Q to cause sliding of the housing I in the body W when the sleeve Q is slid along the body W.

A tongue O, which is formed integrally with the body W, locates in a suitable groove U in the opposing coupling member. This provides an initial location of the opposing couplings.

The sleeve Q which is fitted over the body W is constrained in its longitudinal movement in one direction by an end flange Q1 formed on the sleeve Q, and then in the other direction by a circlip R which is fitted after the sleeve has been positioned over the body W. Within the sleeve Q are four dogs P (see FIG. 5) which are machined or moulded integrally with the sleeve Q to slide through similar slots M, N in the flange rings L and K when the sleeve Q is traversed along the body W.

Referring now to FIG. 6, the diaphragm B is attached to the body W by means of screws. The housing assembly I can slide along the probe A2 under the influence of the drive pins J.

The cable carrying the optical filament F is gripped within a stuffing box gland V1 by means of pressure from a nut $V_2$. The glass filament F together with its protective plastic coating is allowed, as shown, to sag to take up end movement of the probe A2 and is then held by the back nut D2 and finally is secured in the lens type probe A2 by an epoxy or similar resin.

Figure 7:
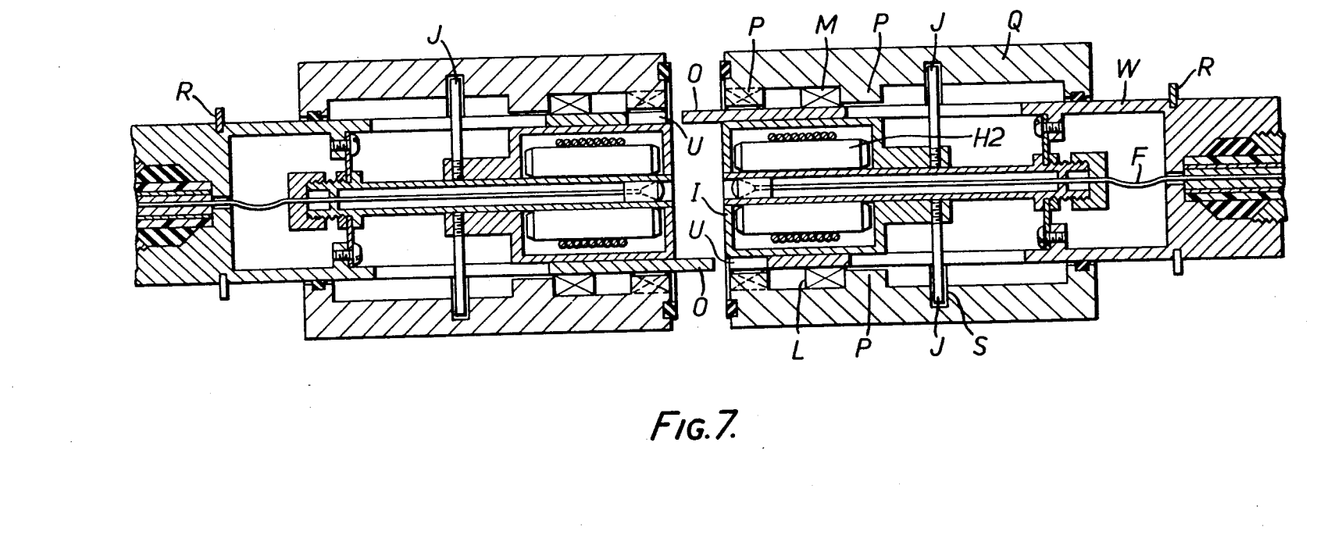
FIG. 7 shows a cross sectional view of a left hand coupling member being offered to a right hand coupling member.

FIG. 7 shows the two coupling members of the connector being presented to each other for connection of two optical fibres. The initial engagement is by the tongues O engaging slots U formed in the main body W.

Figure 8:
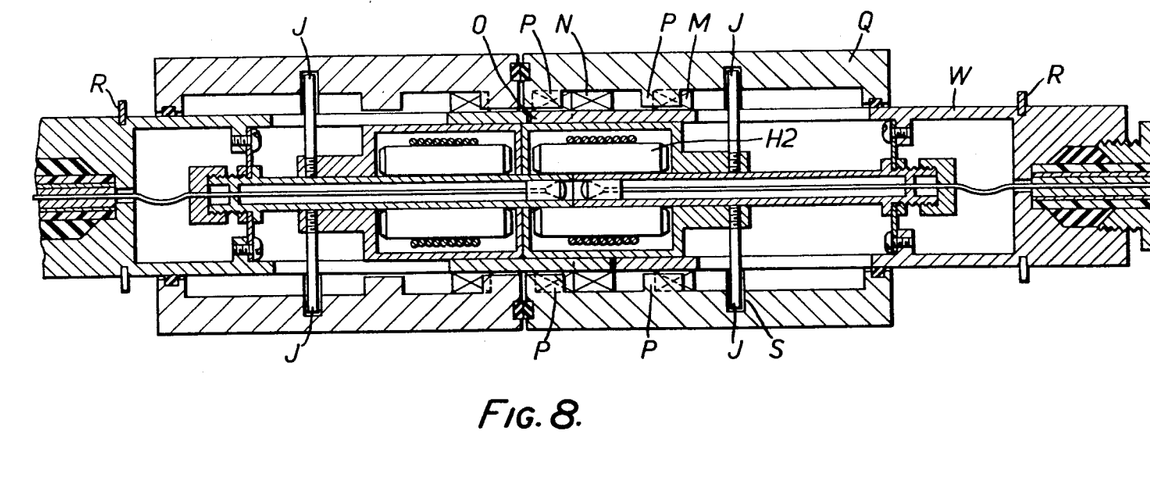
FIG. 8 shows the arrangement of FIG. 7 with the active right hand bayonet gate retaining device being moved towards the redundant left hand bayonet gate retaining device.

FIG. 8 shows the right hand sleeve Q being moved toward the left hand sleeve and pushing the redundant left hand sleeve towards its retaining clip R. At this stage the left hand probe is entering the right hand spring collet H2 under the action of the drive pins J and the pegs P in sleeve Q are sliding through the slots N and M in the main body W.

Figure 9:
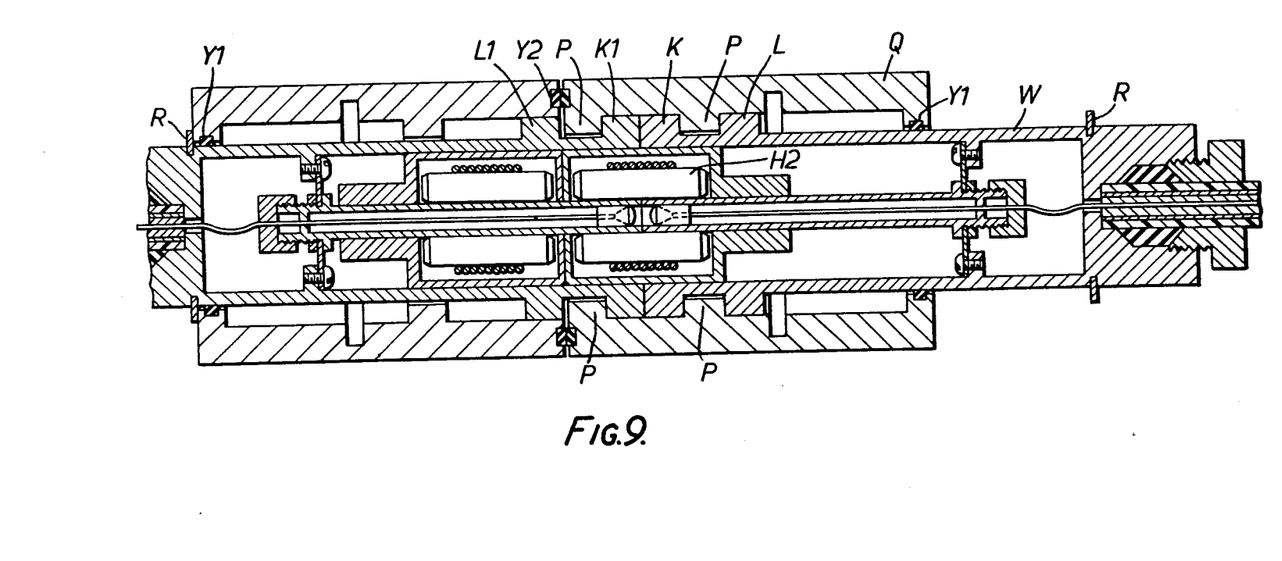
FIG. 9 shows a cross sectional view of the connector fully coupled.

FIG. 9 shows the connector fully coupled with the right hand sleeve Q rotated so that the pegs P lock between the rings L1 and K1. Seals Y1 and Y2 prevent ingress of dirt, moisture etc. into the connector. If the seals Y2 are made flexible and the sleeve Q and its pins or dogs P are dimensioned correctly with respect to the rings L1 and K1 pressure can be applied to squeeze the seals Y2 to form a moisture tight seal.

Figure 10A:
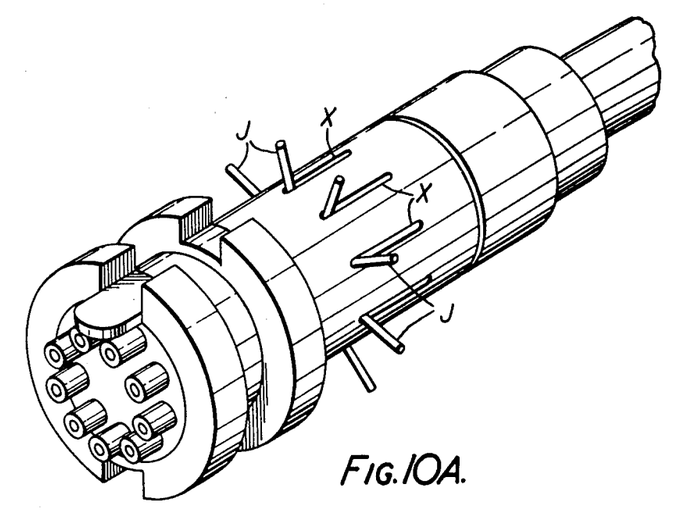
FIGS. 10A, 10B, 10C show a multiple optical fibre hermaphrodite coupling member.
Figure 10B:
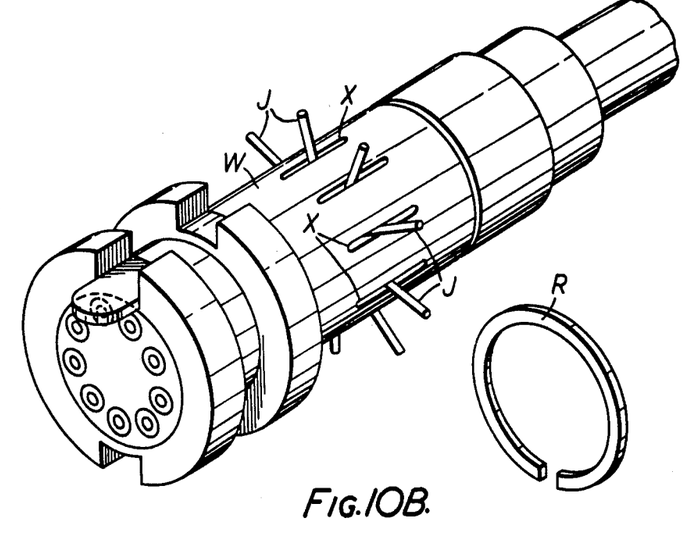
Figure 10C:
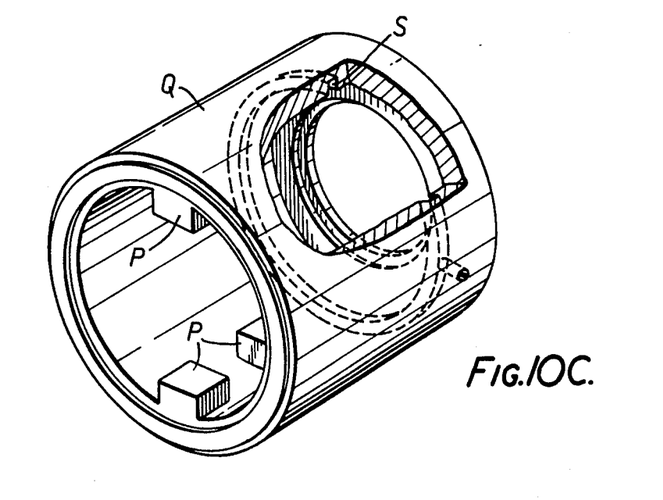

FIGS. 10A, 10B and 10C show how multiple lens or filament type probes can be coupled using the principles above described. As above each collet assembly and its housing is driven by its own pin J projecting through slots X in the main coupler body.

Figure 11A:
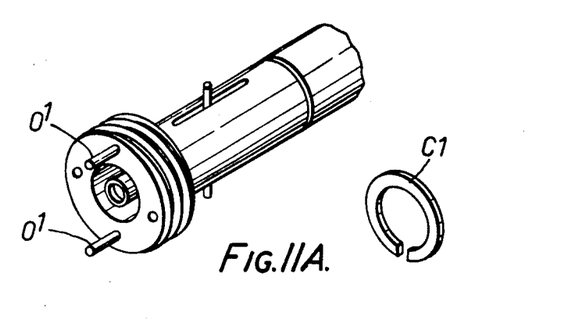
FIGS. 11A, 11B and 11C show an alternative threaded coupling arrangement.
Figure 11B:
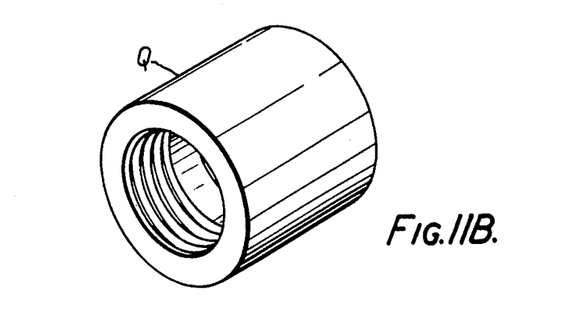
Figure 11C:
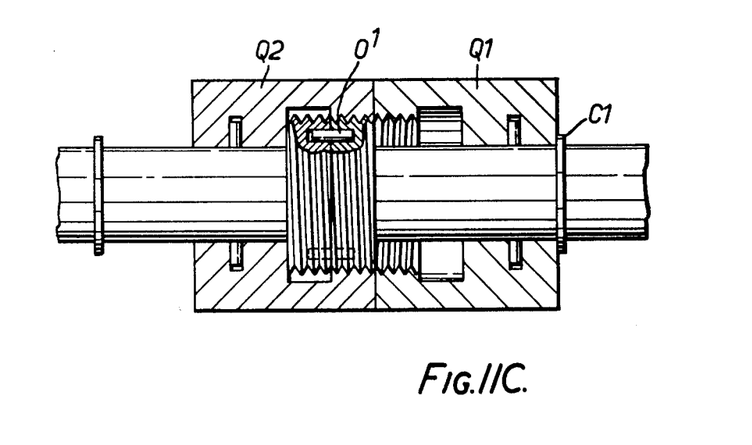

FIGS. 11A, 11B, 11C show that instead of the bayonet action produced by sleeve Q achieving the mechanical retention and operation arrangement for the connector, the same effect can be provided by a screw threaded sleeve arrangement.

The arrangement comprises two sleeves Q1, Q2 on opposing coupling members one or other being screwed so that the sleeve joins together both coupling members and also pushes the spring collet assembly by pressure against the left hand driving pin as shown in FIG. 11C.

As previously described relative rotation of the two coupling members is prevented by means of projecting tongues or by pins $O^1$ as shown in FIG. 11A.

In the above embodiments when the coupling members are not in use i.e. during storage or transit they may be protected from damage or ingress of dirt, moisture etc., by a suitable cover cap.

What we claim is:

1. An optical connector for the end of an optical fibre, comprising:
   a hollow cylinder adapted to be secured to the end of said optical fibre;
   an elongate housing assembly axially slidably mounted on said hollow cylinder and being intimately in contact therewith;
   a main body secured to said hollow cylinder and also surrounding said elongate housing assembly, wherein said elongate housing assembly is axially slidable between said hollow cylinder and said main body; and
   actuating means extending from said elongate housing assembly through said main body for enabling movement to be imparted to said elongate housing assembly externally of said main body;
   said optical connector being adapted to be mated to a further identical connector secured to the end of a further optical fibre having a hollow cylinder and a main body, with the ends of said hollow cylinders and said main bodies of respective said optical connector and said further optical connector abutting, and said elongate housing assembly moved axially to project within the main body of said further optical connector and to abut the elongate housing assembly thereof and to span the abutting ends of said hollow cylinders and said main bodies.

2. An optical connector as claimed in claim 1, wherein the hollow cylinder is adapted to receive said optical fibre such that it extends through the whole length of the hollow cylinder, the end of the optical fibre being substantially flush with the end of the hollow cylinder.

3. An optical connector as claimed in claim 1, wherein a lens is mounted inside the hollow cylinder adjacent to the end thereof.

4. An optical connector as claimed in claim 3, wherein the lens is spaced from the end of the hollow cylinder and a plurality of holes is formed in the hollow cylinder wall between the end of the hollow cylinder and the lens.

5. An optical connector as claimed in claim 1, comprising a collet, said collet comprising a plurality of precision rods and a coil spring, said precision rods being held together in a radially spaced relationship by said coil spring, said collet being located within said elongate housing assembly.

6. An optical connector as claimed in claim 1, comprising a resilient diaphragm, said resilient diaphragm securing said main body to said hollow cylinder to permit a degree of relative axial movement therebetween.

7. An optical connector as claimed in claim 1, wherein said actuating means comprises a plurality of projections, said main body having a wall and being provided with a plurality of slots in said wall, said plurality of projections projecting through said plurality of slots.

8. An optical connector as claimed in claim 7, comprising a sleeve member, said sleeve member being axially slidably mounted on said main body and engaging said projections, whereby axial movement of said sleeve member on said main body imparts axial movement to said elongate housing assembly.

9. An optical connector as claimed in claim 8, wherein said sleeve member can be locked in a predetermined position on said main body by a bayonet-type locking device.

10. An optical connector as claimed in claim 8, wherein said sleeve member is threadably mounted on said main body, whereby rotation of said sleeve member causes axial movement thereof, said sleeve member being adapted to engage said projections, whereby axial movement of said sleeve member causes axial movement of said elongate housing assembly.

11. An optical connector as claimed in claim 1, wherein relative rotation between said two abutting main bodies is prevented by a projection and a recess formed in the end of each said main body.

12. An optical connector as claimed in claim 1, comprising a plurality of hollow cylinders, each being adapted to be secured to the end of an optical fibre.

* * * * *